United States Patent [19]
Machlanski

[11] 3,775,687
[45] Nov. 27, 1973

[54] CAPACITANCE DIFFERENCE MEASURING CIRCUIT

[76] Inventor: Henry T. Machlanski, Rd. 3, Huntington, L. I., N.Y. 11743

[22] Filed: Dec. 17, 1971

[21] Appl. No.: 209,190

[52] U.S. Cl............ 324/60 C, 307/238, 324/59, 328/151
[51] Int. Cl............ G01r 11/52, G01r 27/26
[58] Field of Search............ 324/60 C, 59, 111, 324/60 R; 307/257, 238; 328/151

[56] References Cited
UNITED STATES PATENTS

| | | | |
|---|---|---|---|
| 3,012,192 | 12/1961 | Lion | 324/60 R X |
| 3,577,072 | 5/1971 | Miller | 324/60 C |
| 3,474,259 | 10/1969 | Rodgers | 328/151 X |
| 3,116,458 | 12/1963 | Margopoulos | 328/151 X |
| 3,077,544 | 2/1963 | Connelly | 307/257 |
| 3,201,641 | 8/1965 | Thorne | 307/257 X |

Primary Examiner—Stanley T. Krawczewicz
Attorney—John A. Reilly et al.

[57] ABSTRACT

A circuit and method for producing an output signal which is a function of the relative capacitances of two capacitors. Each capacitor is excited by an AC voltage. The voltage drop resultant on the charge passing through one capacitor is applied during only the positive half-cycle of the alternating voltage applied to that capacitor, across an output capacitor. The voltage developed by the charge passing through the other capacitor, during only the negative half-cycle of the alternating voltage applied thereto, is also applied across the output capacitor. The signal is observed by measuring the accumulated charge on the output capacitor, or the net charging current passing therethrough. The output signal is thus a plus or minus DC voltage and/or net charging current.

2 Claims, 6 Drawing Figures

CAPACITANCE DIFFERENCE MEASURING CIRCUIT

BACKGROUND OF THE INVENTION

1. Field of the Invention

This invention relates to the field of electronic detection circuits and methods, and particularly to circuits for producing a signal dependent on relative capacitances.

2. Description of the Prior Art

It is known to provide a detector circuit which provides a DC output varying in response to a change to a change in ratio of two capacitances. Such circuits typically include a reference source of alternating voltage which is applied to a capacitance bridge and to a standard diode ring demodulator. The capacitive bridge contains, in two of its legs, the capacitors whose varying relationship causes the change in output. Any change in the ratio of these capacitances results in an output from the bridge which is phase shifted with respect to the reference, the amount of shift depending on the ratio of capacitances. The output from the capacitance bridge is then applied to the ring demodulator. The diode ring compares the relative phase of the output of the capacitive bridge and that of the reference frequency input from the source, and furnishes a DC signal which is a function of that difference.

One disadvantage of such prior art circuits is that each requires circuitry for providing a reference signal as well as a signal to actuate the bridge. Accordingly, it is one purpose of this invention to provide a circuit for producing a signal dependent on relative capacitances, wherein only one signal is used, i.e., the actuation signal applied to the capacitors, and which has no need for a separate reference signal, and its associated circuitry.

The prior art circuitry operates, as noted above, on the basis of phase shift between the output signals from the capacitive bridge and the reference signal. This dependence on phase shift to produce a signal often imposes limits on the circuit designer in terms of the inductive and reactive values of the other elements in associated circuitry because variations in such values will affect the crucial phase relationship, within the typical capacitive detector device. It is therefore another object of this invention to provide a capacitance detector circuit which is totally independent of any phase relationships between signals in any portion of the circuit.

A source of some dissatisfaction in connection with the use of prior art circuits is that the capacitive circuits employed typically have a high impedance output. This generally means that the only practical use of such an output is to measure its voltage. Such voltage measurements across high impedance outputs are susceptible to noise interference, and are therefore of limited utility. Current measurements of output, however, made across low-impedance output terminals are not so susceptible to noise. Therefore, it is a further purpose of this invention to provide a circuit of the type described which is capable of providing an output which can be measured both as a high impedance voltage output, and a low-impedance current output.

SUMMARY OF THE INVENTION

This invention accomplishes the foregoing and other purposes by means of an apparatus including a voltage source for applying AC excitation to first and second variable capacitors, at least one being variable. An output capacitor is also supplied, and circuit means is connected between the one plate of each of the capacitors, and the output capacitor, for the purpose of charging the output capacitor to a degree which is dependent on the relative capacitances of the capacitors.

The circuit means passes positive charge accumulating on the connected plate of the first capacitor through a diode in a forward direction. The resultant positive forward voltage across the diode is picked off and applied to the output capacitor. The circuit means grounds directly any negative charge on the connected plate of the first capacitor, bypassing the output capacitor altogether.

Similarly, with respect to the second capacitor, the circuit passes negative charge on the connected plate thereof backward through a diode, applying the negative voltage thus derived to the output capacitor. Positive charge on the connected plate is directly grounded.

The relative capacitances of the capacitors can then, therefore, be measured by simply ascertaining the DC accumulated net charge present on the output capacitor. Moreover, the net charging current passing through the output capacitor can be measured by means of a low impedance device. Thus, this circuit is susceptible of application to both voltage and current measurements, the output impedance being high in the case of voltage measurements, and low in the case of current measurements.

It can be seen that the circuitry of this invention does not require separate reference and excitation signals, the excitation signal on the capacitor serving both to excite said capacitors and to provide the output signal. It is also clear that the circuitry of this invention is operable independently of the relative phasing of the AC excitation of the two capacitors. The excitation need not be in phase for the circuit to operate properly.

DESCRIPTION OF THE PREFERRED EMBODIMENT

Figure 1:
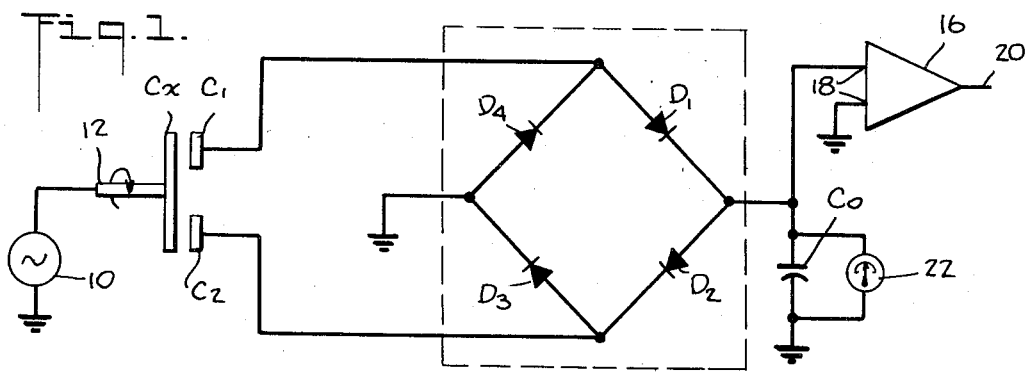
FIG. 1 is a schematic diagram of the detector circuitry of this invention, showing the variable capacitors which are excited by an AC source, the diode circuitry, and its connection to the output capacitor.
Figure 3:
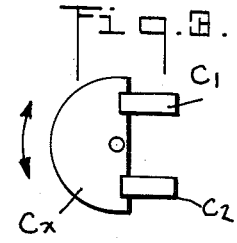
FIG. 3 is a view showing the configuration of the excitation plate of the actuating capacitors.

FIG. 1 shows a detailed schematic diagram of the preferred embodiment of the circuit of this invention. The capacitors which actuate the circuit include a common excitation plate $C_x$, which is excited with an alternating voltage from voltage source 10. The capacitors also comprise capacitor plates $C_1$ and $C_2$, as shown. $C_x$ is rotatably mounted on shaft 12. The configuration of $C_x$ may be any configuration such that, as $C_x$ is rotated on shaft 12, the relative areas of capacitances $C_1$ and $C_2$ can be changed. As an example $C_x$ may have a semicircular configuration, as shown in FIG. 3.

The output of the circuit of this invention appears across output capacitor $C_0$, as shown, $C_0$ being connected to each of plates $C_1$ and $C_2$ by means of the diode circuitry indicated within zone 11, which is discussed hereinbelow.

Diode circuitry 11 is designed such that it applies positive charge to output capacitor $C_0$ during that portion of the alternating voltage cycle in which positive voltage appears on capacitor plate $C_1$. The amount of charge so deposited on capacitor $C_0$ is a function of the capacitance of the capacitor comprising plate $C_1$ and that portion of excitation plate $C_x$ which is aligned proximate to plate $C_1$. When a negative charge appears on plate $C_1$, that negative charge is drained off directly to ground, and has virtually no effect on the charge present on output capacitor $C_0$.

In a converse manner, diode circuitry 11, in conjunction with plate $C_2$, deposits negative charge on output capacitor $C_0$ when plate $C_2$ bears negative charge, the amount of the charge so deposited being a function of the capacitance of the capacitor formed by plate $C_2$ and that portion of plate $C_x$ which is aligned proximately to $C_2$.

Figure 2A:
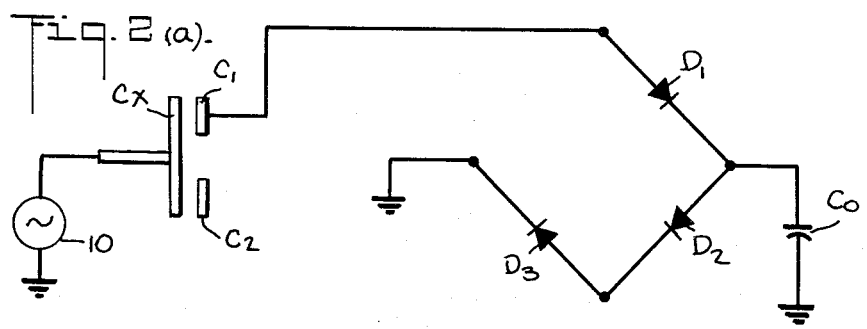
FIG. 2(a) is a schematic diagram of that part of the circuitry which functions when one of the variable capacitors is charged positively at its plate which is connected to the diode circuitry.

This manner of operation is best described in connection with an examination of FIG. 2(a)–2(d). FIG. 2(a) illustrates the operative components of the circuitry during that period in which a positive charge appears on capacitor plates $C_1$ and $C_2$. When plate $C_1$ accumulates positive charge by virtue of the excitation of voltage source 10, that charge flows from plate $C_1$ to ground through diodes $D_1$, $D_2$, and $D_3$. It is noted at this point that this circuit operates and is effective by virtue of the fact that the diode is not in reality a perfect element, i.e., all diodes have some forward voltage drop when positive charge is passed through them in a forward direction. Therefore, it can be seen that the illustrated connection between diodes $D_1$ and $D_2$ and the upper plate of output capacitor $C_0$ will cause a positive charge to appear and to be deposited on the upper plate of capacitor $C_0$ while positive charge flows from capacitor plate $C_1$ to ground through the three aforementioned diodes. The amount of charge so deposited will be a function of the charging voltage and the length of time during which charge flows from $C_1$ to ground. Thus, since it is well known that capacitance, for a fixed voltage applied, is proportional to the amount of charge carried by the capacitor, the charge flowing through the three diodes and consequently the amount of positive charge deposited on capacitor $C_0$ will be a function of the capacitance of the capacitor comprising plate $C_1$ and that portion of plate $C_x$ which is proximately aligned therewith. This, of course, assumes that $C_0$ is sufficiently large to accumulate charge thereon during substantially all of the half-cycle of voltage applied.

Figure 2B:
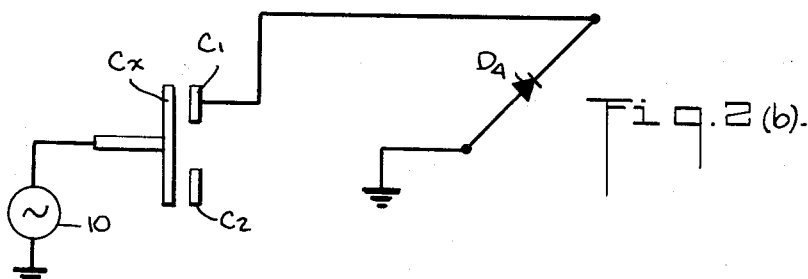
FIG. 2(b) is a schematic diagram of the functioning parts of the circuitry when the same plate at said capacitor bears a negative charge.
Figure 2C:
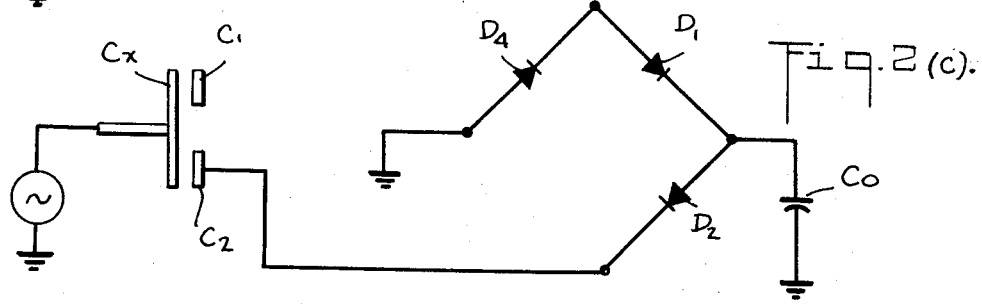
FIG. 2(c) is a schematic diagram of the functioning portions of the diode circuitry when the other variable capacitor is charged negatively at its plate which is connected to the diode circuitry.
Figure 2D:
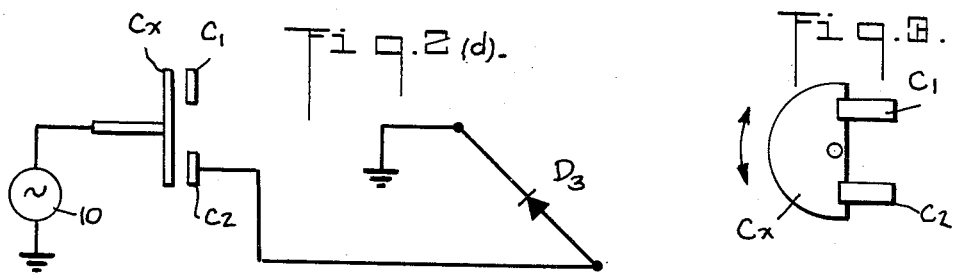
FIG. 2(d) is a schematic diagram of the functioning portion of the diode circuitry which is operable when said other capacitor bears a positive charge on its plate which is connected to the diode circuitry.

Examining FIG. 2(d), it can be seen that the appearance of positive charge on plate $C_2$ concomitantly with the above described appearance of positive charge on $C_1$ has virtually no effect on output capacitor $C_0$, since any positive charge accumulating on $C_2$ is drained off directly to ground through diode $D_3$.

Considering the case in which plates $C_1$ and $C_2$ bear negative charge induced by alternating voltage source 10, FIG. 2(c) illustrates that negative charge on plate $C_2$ passes therefrom to ground in a backward direction through diodes $D_1$, $D_2$, and $D_4$. This phenomenon due to the aforementioned voltage drop across the diodes, induces a negative voltage on capacitor $C_0$ by virtue of the connection of the upper plate thereof to the point between diodes $D_1$ and $D_2$. Similarly to the manner of operation described in FIG. 2(a) the amount of negative charge so deposited on $C_0$ will depend upon the length of time that negative charge flows from $C_2$ to ground in the above referenced manner. Therefore, the amount of negative charge deposited on $C_0$ will be a function of the capacitance of the capacitor comprising plate $C_2$ and that portion of plate $C_x$ which is aligned proximately therewith. With reference to FIG. 2(b) the appearance of negative charge on capacitor plate $C_1$ has virtually no effect on output capacitor $C_0$, such negative charge passing directly to ground through diode $D_4$, bypassing entirely the output capacitor $C_0$.

An interesting phenomenon with respect to capacitor $C_0$ results from the operation as described hereinabove. It will be noted that, if the capacitances of the capacitors comprising $C_x$, and $C_1$ and $C_2$, respectively, are unequal, a net charge will appear across the plates of output capacitor $C_0$. If the capacitance of the capacitor comprising plate $C_1$ is greater than that of the capacitance comprising plate $C_2$, the upper plate of capacitor $C_0$ will have a net positive charge resident thereon (perhaps with a small ripple due to the alternating nature of the excitation voltage). If, on the other hand, the capacitance of the capacitor comprising plate $C_2$ is greater than that of the plate $C_1$ capacitor, $C_0$ will bear a net negative charge on its upper plate. Thus, it can be seen that, with proper calibration, the ratio of capacitances between the capacitors including plate $C_1$ and plate $C_2$ can be measured by means of a high impedance voltmeter placed across the terminals of capacitor $C_0$, illustrated at 22 in FIG. 1. It also follows that if the net accumulated charge across capacitor $C_0$ is regarded as an output signal, this output signal can be changed within limits in a predictable fashion as a function of the angular position of excitation plate $C_x$ with respect to plates $C_1$ and $C_2$. Thus, this circuit is suitable either for measuring the relative capacitances of the capacitors comprising $C_1$ and $C_2$, or for the generation of an output signal in response to the mechanical position of excitation plate $C_x$. Such a property of this circuit has obvious utility in connection with feedback control and servo systems.

It is also noteworthy that, in operation, a discernible net charging current will flow through capacitor $C_0$ as a result of the alternate positive and negative charge applied by virtue of the capacitors and diode circuitry discussed hereinabove. It can be seen by inspection that this net charging current will be zero when the capacitances of capacitors comprising plates $C_1$ and $C_2$ are equal, and will increase with increasing inequality in these capacitances. Therefore, if the terminals of output capacitor $C_0$ are connected across the low input inverting terminals 18 of an operational amplifier 16, it is possible to generate a substantial signal at output 20 of the amplifier which is a function of the amount of net charging current flowing through capacitor $C_0$.

It can, therefore, be seen that the circuitry of this invention is capable of producing an output which is susceptible of measurement either as a high impedance DC voltage output or as a low impedance DC current output. As discussed hereinabove, prior circuits for accomplishing similar aims have been successful generally only as sources of high output impedance DC voltage signals.

It is also noteworthy that the operation of this circuit is independent of the relative phase of the excitation signals impressed on plates $C_1$ and $C_2$. Thus, plates $C_1$ and $C_2$ instead of being excited by a single voltage source through single excitation plate $C_x$, could be totally independent capacitors, each excited by an entirely separate AC voltage source. The circuit would operate equally as well as in the described manner. Additionally, the magnitude of alternating voltage impressed on the capacitor plates $C_1$ and $C_2$ need not even be equal, although inequality of such voltage would result in the need for specialized calibration of the device. Nonetheless, even if the voltages were unequal, the output signals on capacitor $C_0$ would still vary as a function of the relative capacitances of the capacitors comprising $C_1$ and $C_2$.

Additionally, it is to be noted that an effect equivalent to changing the relative capacitances $C_1$ and $C_2$ can be obtained by varying the relative excitation voltages on $C_1$ and $C_2$. In this way, the output signal can be made to vary as a function of the voltages on one or both capacitors.

Although a number of diodes are suitable for application within this circuit, applicant has found that IN 914 diodes operate well. The diodes should be chosen generally such that they have a relatively high forward voltage drop, in order to achieve the highest possible output signal on capacitor $C_0$. The value of $C_0$ must be sufficiently large to smooth out the AC ripple from the excitation input somewhat, so that a suitable voltage measurement can be made across $C_0$. Applicant has found that a suitable value for $C_0$ lies in the range of 0.001–0.1 microfarads. A suitable frequency of operation for this circuit can be in the range of 10,000 to 500,000 Hz.

Applicant has found that he can achieve with this circuitry, a DC voltage output of up to approximately 0.8 volts. By applying the signal across the terminals of capacitor $C_0$ to the inverting low impedance inputs of an operational amplifier, and thus measuring the current through the capacitor, voltage signals of approximately 10 volts can be obtained.

The embodiment discussed herein employs variable capacitors to actuate the circuit and produce the output signals. Applicant has also found, however, that, when the variable capacitors $C_1$ and $C_2$ are replaced by variable inductors, the circuit operates in a manner analogous to that already described. The inductors are excited with an alternating voltage, and the voltage drop across each is a function if its inductance. These voltage drops can be applied to the diode circuitry described, just as the charge flow from the capacitor $C_1$ and $C_2$ is applied. This will induce current flow across the diodes, and alternate positive and negative charging of the output capacitor. The charge, and net charging current, on and through capacitor $C_0$ will then be a function of the relation values of the variable inductances.

It is to be noted that the embodiments discussed in this application are considered to be illustrative, rather than exhaustive, and that one can construct embodiments deviating from the specific embodiments shown herein without departing from the spirit of the invention.

What is claimed is:

1. A method for providing a signal which is a function of the relative charges generated on first and second capacitors, comprising the steps of:
   a. exciting said capacitors with alternating voltage,
   b. applying only positive charge in a fixed polarity to an output capacitor by means of said first capacitor at a rate which is substantially a function of the positive charge generated on one plate of said first capacitor, said step of applying positive charge comprising:
      i. passing forward through a first diode only positive charge generated on one plate of said first capacitor and applying resultant positive voltage drop across said diode to said output capacitor in a fixed polarity, and
      ii. passing the negative charge generated on said first capacitor to ground by means of a diode, causing flow of said negative charge from said first capacitor to bypass said first diode,
   c. applying only negative charge in a fixed polarity to said output capacitor by means of said second capacitor at a rate which is substantially a function of the negative charge generated on one plate of said second capacitor, said step of applying negative charge comprising:
      i. passing in a backward direction through a second diode only negative charge generated on one plate of said second capacitor, and applying the resultant negative voltage drop across said second diode to said output capacitor, in said fixed polarity, and
      ii. passing positive charge generated on said second capacitor to ground by means of a diode causing flow of positive charge from said second capacitor to bypass said output capacitor, and
   d. measuring one of the average net accumulated charge on said output capacitor and the value of net charging current through said capacitor.

2. An apparatus for providing a signal at an output element which is a function of the relative charges on two capacitors, said apparatus comprising:
   a. first and second capacitors,
   b. means connected to said capacitors to excite said capacitors with alternating voltage,
   c. an output capacitor comprising said output element,
   d. means connected between said first capacitor and said output capacitor for applying only positive charge by means of said first capacitor, and in fixed polarity to said output capacitor, the rate of positive charge so applied being substantially a function of the positive charge generated on one plate of said first capacitor, said means for applying positive charge comprising:
      i. a first diode connected in a forward direction between said first capacitor and ground, and connections between said first diode and said output capacitor to apply across said output capacitor the positive voltage drop resultant on flow of positive charge from said first capacitor through said first diode, and ii. diode means connected to said first capacitor to pass to ground only negative charge appearing on said first capacitor, the resultant charge flow bypassing said connection to said output capacitor, e. means connected between said second capacitor and said output capacitor for applying only negative charge by means of said second capacitor and in a fixed polarity to said output capacitor, the rate of negative charge so applied being substantially a function of the negative charge generated on one plate of said second capacitor, said means for applying negative charge comprising:

i. a second diode connected in a backward direction between said second capacitor and ground and connections to apply across said output capacitor the voltage drop across said diode resultant on flow of negative charge from said second capacitor through said second diode, and ii. diode means connected to said second capacitor to pass to ground only positive charge appearing on said second capacitor the resultant charge flow bypassing said connections to said output capacitor.

* * * * *